Feb. 24, 1959 — W. S. BRINK — 2,874,749
VALVE FOR DIRECTIONAL CHANGE
Filed Aug. 3, 1956
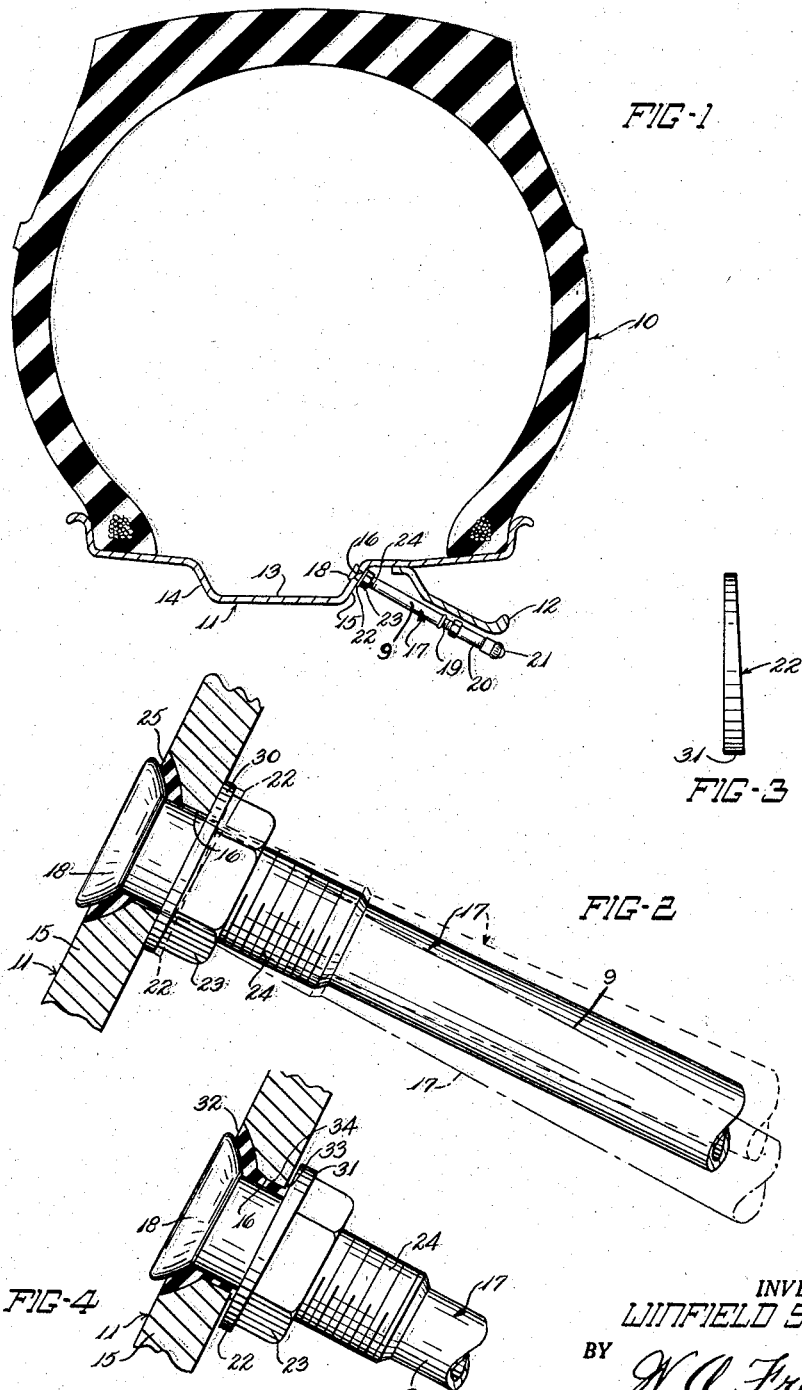
INVENTOR.
WINFIELD S. BRINK
BY W. A. Fraser
ATTY.

United States Patent Office 2,874,749
Patented Feb. 24, 1959

2,874,749

VALVE FOR DIRECTIONAL CHANGE

Winfield Scott Brink, Akron, Ohio, assignor to The Firestone Tire & Rubber Company, Akron, Ohio, a corporation of Ohio Application August 3, 1956, Serial No. 601,997

5 Claims. (Cl. 152—427)

This invention relates to drop-center truck tire rims adapted for use with tubeless truck tires. Such rims have come into general use and the clearance between such a rim and the brake drum is so limited, that it is a problem to locate the tire inflating valve stem, so that the stem will clear the rim and the brake drum, and be accessible for contact with an air chuck.

Presently, the valve hole of a drop-center rim is disposed either through the center of the base or through the slanting side of the well of the rim. If the valve hole is located in the center of the base of said well the rim is embossed radially outwardly at the valve hole and the valve stem is necessarily of the angle-valve type so as to follow a changing angular course between the rim and the brake drum.

When the rim valve hole is located in the slanting side of the well of the rim, a straight valve stem may be used, in which case the barrel extends parallel with the axis of the rim valve hole. Because of the variation between the constructions of the rim mountings of different wheel manufacturers, it has been necessary to provide at least three rim constructions having differently embossed portions adjacent the rim valve hole in said slanting side of the rim well, so that by selection of the rim, the valve stem could be deflected slightly in the opposite directions, from the axis of the rim valve hole radially of the rotation of the tire. As will be understood by those familiar with the art, the different positions are required to meet the variations in clearance for the stem, which variations are brought about by the wheels of different manufacturers having different depths or offset of their disc wheels. Differences in disc offset require different mounting rings, which results in a difference in the clearance between the brake drum and the rim mounting ring. The need for the three or more embossings at the valve hole just mentioned requires an expensive stock of rims to provide each different type of embossing.

It is an object of the present invention to provide a rim and valve stem combination, so constructed that the angle of the valve stem with the axis of a rim valve hole may be conveniently changed, making it unnecessary for a rim manufacturer to stock more than one type of rim for each size of rim manufactured.

Referring to the drawings:

Fig. 1 is a sectional view of a tubeless tire rim, a tire, a rim mounting ring and valve assembly embodying the present invention.

Fig. 2 is an enlarged fragmentary view showing, in detail, the construction of said rim at a valve hole, a valve stem, a sealing gasket, a beveled washer disposed between a valve lock nut and the rim, and illustrating diagrammatically by dot and dot-dash lines, the manner in which the direction the valve stem projects from the valve stem hole may be varied.

Fig. 3 is a side elevation of the beveled washer.

Fig. 4 is similar to Fig. 2 but showing a modified form of a sealing gasket.

Referring to the drawing in more detail, it will be seen by reference to Fig. 1 that a tubeless tire 10 is mounted on a drop-center type rim 11. A mounting ring 12 is permanently attached to rim 11 by welding or in any manner found satisfactory. Rim 11 has a well portion 13, said well portion having slanted sides 14 and 15. Slanted side 15 is provided with a valve hole 16 in which is disposed a tire inflating valve stem 17. Stem 17 comprises a head portion 18 and a barrel 9. Said barrel has the usual externally threaded portions 19 and 24, threads 19 receiving, in air-tight threaded relation, a valve extension 20, and threads 24, a hexagon nut 23. Said valve extension includes the usual valve-insides of conventional tire inner tube valves and a valve cap 21. Valve stem 17 is retained in operative position relative to the rim by means of a tire valve ring washer 22 which is disposed between the tire rim and the nut 23. It is to be noted that washer 22 is beveled on one side only, and that the unbeveled side of the washer is in contact with the rim.

As best shown in Fig. 2, the surface of the lateral sides of head portion 18 are convex and contact a rubberlike sealing washer 25. Sealing gasket 25 may be molded either flat or concavo-convex. The side of the first extent of valve hole 16 that faces toward tire 10 is of concave shape substantially complementary to the convex shape of valve head 18.

The assembly shown in Fig. 1 is made by first placing gasket 25 on valve stem 17 and pressing the gasket against valve head 18. Next the threaded end portion 19 is projected through valve rim hole 16 from the tire side of the rim, and the stem 17 is drawn through the valve hole until the valve head 18 is drawn firmly against gasket 25. If it is desired that the barrel 9 project from the sloped side 15 parallel with the axis of valve hole 16, a conventional ring washer, such as 30, is placed over said barrel and against the surface of the rim. Next, nut 23 is run down on threads 24 and tightened firmly against rim washer 30, thus pulling valve head 18 tightly against gasket 25. If the clearance between mounting ring 12 and the brake drum (not shown) of the wheel is such as to interfere with the barrel 9 when disposed as just explained, the direction the barrel projects, relative to the rim, may be changed by replacing rim washer 30 with a beveled washer 22, as indicated by the dash-dot lines in Fig. 2. Barrel 9 may be tilted in the opposite direction from that indicated by the dash-dot line of Fig. 2 by the simple expedient of placing thickened portion 31 of nut 22 diametrically opposite its previous position, as indicated by the dotted lines of Fig. 2. It is to be understood that if desired, beveled washer 22 may be scored or otherwise marked to indicate the thick and thin portion for the convenience of accurately placing these portions in the desired position in the assembly.

It will now be seen that, because of the substantially complementary surfaces of the side of the valve hole and the head of the valve, with the sealing gasket interposed therebetween, an air tight ball-and-socket type joint has been provided, which joint will permit the changing of the direction the valve barrel extends, thereby providing means whereby interference with the valve stem may be avoided.

Referring now to Fig. 4, there is illustrated a modified sealing gasket 32 that is different from gasket 25 in that it is molded to fit the sides of valve hole 16 as at 34, and to project a short distance therebeyond. The thickness of the wall of gasket 32 and the size of the opening therethrough relative to the diameter of stem 17 is such that the clearance between the valve head and the valve stem, before nut 23 is tightened against the ring washer, is substantially completely occupied. When the nut 23 is tightened against ring washer 22, the washer is forced against the projecting portion 33 of the rubbery gasket 32, and the valve head 18 is held tightly against the radially outer portion of the gasket on the other side of the base of rim 11. By this means, the portion 34 of the gasket between the valve stem and the side of the rim valve hole is distorted and squeezed firmly against said stem and side of the valve hole, thereby providing an air-tight seal between those parts at the cylindrical portion of the rim valve hole. The distortable and resilient characteristics of the rubbery material of which gasket 32 is composed, permits sufficient movement of the valve stem within the valve hole to permit the changing of the direction of extent of the valve barrel, explained hereinabove, relative to the beveled washer 22 used for that purpose. The construction shown in Fig. 4 provides three points of positive sealing, namely, between the head of the valve and a surface of the side of the valve hole; between the cylindrical wall 34 of the valve stem and the cylindrical side of the valve stem hole; and between the ring washer and the rim.

I claim:

1. A tire rim and valve-stem assembly adapted for use with a tubeless tire, said stem having a barrel and a head-like base portion, said rim having a valve stem hole, the surface of the side of the valve hole adjacent the tire side of said rim being of spherical shape, said valve stem being disposed in said valve hole with the valve barrel extending therethrough and projecting radially inwardly thereof with said valve base being disposed on the tire side of the rim, the surface of said valve base facing said rim being of spherical shape, said shape of the side of the valve hole and valve base being substantially complementary, a rubber-like sealing gasket on said barrel adjacent said base and in contact with said spherical surfaces, means for changing the direction of projection of said barrel, said means comprising a rigid rim washer having a flat and a beveled side, said rim washer being mounted on and rotatable on said barrel, and a lock nut on said barrel, said flat side of said rigid washer being in contact with the rim and said nut being in contact with the beveled side of said rigid washer.

2. A tire rim and valve-stem assembly adapted for use with a tubeless tire, said stem having a barrel and a head-like base portion, said rim having a valve stem hole, the surface of the side of the valve hole adjacent the tire side of said rim being of spherical shape, said valve stem being disposed in said valve hole with the valve barrel extending therethrough and projecting radially inwardly thereof with said valve base being disposed on the tire side of the rim, the surface of said valve base facing said rim being of spherical shape, said shape of the side of the valve hole and valve base being substantially complementary, a rubbery sealing gasket on said barrel adjacent said base and in contact with said spherical surfaces, a rigid beveled rim washer mounted on and in rotatable relation with said barrel and in contact with the radial inner surface of said rim, a nut in threaded relation with said barrel and tightened firmly against said rim washer, whereby the spherical surface of the base of the valve is drawn firmly against said sealing gasket and clamps the rubbery gasket between the spherical surfaces of the side of said valve hole and said valve base.

3. A tire rim and valve-stem assembly adapted for use with a tubeless tire, said stem having a barrel and a head-like base portion, said rim having a valve stem hole, the surface of the side of the valve hole adjacent the tire side of said rim being of spherical shape, said valve stem being disposed in said valve hole with the valve barrel extending therethrough and projecting radially inwardly thereof with said valve base being disposed on the tire side of the rim, the surface of said valve base facing said rim being of spherical shape, said shape of the side of the valve hole and valve base being substantially complementary, a rubbery sealing gasket on said barrel adjacent said base and in contact with said spherical surfaces, a rigid rim washer beveled on one side only carried on said barrel in rotatable relation therewith, the unbeveled side of said rigid washer in contact with the radial inner surface of said rim, a nut in threaded relation with said barrel and tightened firmly against said rim washer whereby the spherical surface of the base of the valve is drawn firmly against said sealing gasket and clamps the rubbery gasket between the spherical surfaces of the side of said valve hole and said valve base.

4. In combination, a tire rim and a tire inflating valve-stem, said stem having a base and barrel portion, said rim having a valve hole with a portion of said base and barrel mounted therein, said barrel extending through said valve hole and projecting a distance from said rim, said stem and rim being joined through the medium of an air-tight ball-and-socket joint, and means for changing the direction of projection of said barrel.

5. In combination, a tire rim and a tire inflating valve-stem, said stem having a base and barrel portion, said rim having a valve hole with a portion of said base and barrel mounted therein, said barrel extending through said valve hole and projecting a distance from said rim, said stem and rim being joined through the medium of an air-tight ball-and-socket joint, and means for changing the direction of projection of said barrel, said means comprising a rigid beveled rim washer, a distortable sealing gasket, and a lock nut mounted on said stem.

References Cited in the file of this patent

UNITED STATES PATENTS

| | | |
|---|---|---|
| 488,946 | O'Neill | Dec. 27, 1892 |
| 776,971 | Walsh | Dec. 6, 1904 |
| 1,380,347 | Blume | June 7, 1921 |
| 1,710,267 | Mueller | Apr. 23, 1929 |
| 2,053,626 | Parker | Sept. 6, 1936 |
| 2,092,358 | Robertson | Sept. 7, 1937 |
| 2,481,823 | Cejka | Sept. 13, 1949 |
| 2,731,065 | Powers | Jan. 17, 1956 |